United States Patent
Kong et al.

(10) Patent No.: US 8,587,874 B2
(45) Date of Patent: Nov. 19, 2013

(54) FLUID PRESSURE LIQUID LENS

(75) Inventors: Seong Ho Kong, Yeongcheon-si (KR);
Hak-Rin Kim, Daegu (KR); June Kyoo Lee, Daegu (KR); Kyung-Woo Park, Daegu (KR)

(73) Assignee: Kyungpook National University Industry-Academic Cooperation Foundation (KR)

( * ) Notice: Subject to any disclaimer, the term of this patent is extended or adjusted under 35 U.S.C. 154(b) by 21 days.

(21) Appl. No.: 13/456,825

(22) Filed: Apr. 26, 2012

(65) Prior Publication Data

US 2012/0275031 A1    Nov. 1, 2012

(30) Foreign Application Priority Data

Apr. 28, 2011  (KR) .................. 10-2011-0040071

(51) Int. Cl.
*G02B 1/06* (2006.01)

(52) U.S. Cl.
USPC .......................................................... 359/665

(58) Field of Classification Search
USPC .......................................................... 359/665
See application file for complete search history.

*Primary Examiner* — Jack Dinh
(74) *Attorney, Agent, or Firm* — Cantor Colburn LLP

(57) ABSTRACT

A fluid pressure liquid lens includes: a fluid pressure driving portion which is configured to include a first cavity, a fluid pressure generating groove, and an actuator generating a fluid pressure on liquid so as to adjust the fluid pressure by using the actuator; a first transparent elastic membrane which is disposed on an upper surface of the fluid pressure driving portion to seal an upper portion of the first cavity of the fluid pressure driving portion and of which the curvature is changed according to the fluid pressure of the liquid; and a transparent substrate which is disposed on a lower surface of the fluid pressure driving portion to seal a lower portion of the first cavity of the fluid pressure driving portion and which is made of transparent material passing through incident light, wherein a focal length is adjusted by using the fluid pressure generated by the actuator.

9 Claims, 6 Drawing Sheets

FLUID PRESSURE LIQUID LENS

CROSS-REFERENCE TO RELATED PATENT APPLICATION

This application claims the benefit of Korean Patent Application No. 10-2011-0040071, filed on Apr. 28, 2011, in the Korean Intellectual Property Office, the disclosure of which is incorporated herein in its entirety by reference.

BACKGROUND OF THE INVENTION

1. Field of the Invention

The present invention relates to a liquid lens and, more particularly, to a fluid pressure liquid lens capable generating a fluid pressure by using an electromagnetic actuator integrated with the liquid lens and adjusting a focal length by using the generated fluid pressure.

2. Description of the Prior Art

In general, an optical lens is a transparent member having at least two refracting surfaces of which the refractive indexes are different. Such an optical lens has been widely used for various fields such as cameras, telescopes, and microscopes. As an example, the optical lens is adapted to camera modules used for mobile terminals such as cellular phones or PDAs. Recently, the mobile terminals have been developed as multi-purpose electronic apparatuses having various multimedia functions such as camera, game, music replaying, broadcasting, and the Internet as well as an audio transmitting/receiving function. Therefore, much more functions needs to be integrated into a limited small space of the mobile terminal.

In addition, in order to obtain better images, the camera module is designed to include an auto focusing function, an auto zooming function, an auto macro function, an anti-shaking functions, and the like. However, with respect to a camera module having high-grade functions installed in a mobile terminal, there is a limitation in the size of the camera module due to the size of the lens and the size of the lens driving unit.

In other words, in order to implement the high-grade functions, in addition to a basic lens, various types of lenses such as a wide angle lens, a standard lens, a telephoto lens, or a zoom lens are replaced according to the purpose. In addition, in order to implement the auto macro function, optical properties such as a focal length need to be adjusted, and separate motor and driver for the adjustment need to be installed. Therefore, there is a problem in that the overall size of the camera module inevitably increases.

Recently, a liquid lens capable of adjusting the focus and magnification of the lens without a lens driving unit has been developed. In the liquid lens, a curvature of the lens is changed by using a change in surface tension according to a voltage, so that an auto focus function and a zoom function are obtained. The change in curvature of the liquid lens is obtained by using electrowetting. In this manner, the liquid lens using the electrowetting does not require mechanical movement of the lens, so that it is possible to reduce the size of the camera module.

In addition, there has been a liquid lens where a curvature of a transparent elastic membrane formed in a lens chamber is changed by changing a pressure, that is, a fluid pressure applied to optical liquid contained in the lens chamber, so that an auto focus function and a zoom function are implemented. Since the liquid lens does not also require the mechanical movement of the lens, so that it is possible to reduce the size of the camera module.

However, in most of the fluid pressure liquid lenses in the related art, a separate fluid pressure generating unit is needed, so that it is difficult to put the fluid pressure liquid lens to practical use. In addition, there is a problem in that the size of the fluid pressure liquid lens increases due to the fluid pressure generating unit.

SUMMARY OF THE INVENTION

The present invention is to provide a fluid pressure liquid lens capable of generating a fluid pressure by using an electromagnetic actuator integrated into the fluid pressure liquid lens and adjusting a focal length of the fluid pressure liquid lens by using the generated fluid pressure, so that it is possible to provide a small-sized fluid pressure liquid lens of which the focus can be quantitatively changed with a high speed.

According to an aspect of the invention, there is provided a fluid pressure liquid lens of which focus can be adjusted, including: a fluid pressure driving portion which is configured to include a first cavity, a fluid pressure generating groove connected to the first cavity, and an actuator generating a fluid pressure on liquid contained in the first cavity and the fluid pressure generating groove so as to adjust the fluid pressure by using the actuator; a first transparent elastic membrane which is disposed on an upper surface of the fluid pressure driving portion to seal an upper portion of the first cavity of the fluid pressure driving portion and of which the curvature is changed according to the fluid pressure of the liquid; and a transparent substrate which is disposed on a lower surface of the fluid pressure driving portion to seal a lower portion of the first cavity of the fluid pressure driving portion and which is made of a transparent material passing through incident light, wherein a focal length is adjusted by using the fluid pressure generated by the actuator.

In the fluid pressure liquid lens according to the above aspect of the invention, it is preferable that the fluid pressure generating groove be perpendicularly connected to the first cavity.

In the fluid pressure liquid lens according to the above aspect of the invention, it is preferable that the fluid pressure liquid lens further include a lens barrel on an upper or lower surface of the fluid pressure driving portion, and a second cavity connected to the first cavity of the fluid pressure driving portion be formed in an inner portion of a body of the lens barrel, and liquid is contained in the second cavity.

In the fluid pressure liquid lens according to the above aspect of the invention, it is preferable that the fluid pressure liquid lens further include a lens barrel between an upper surface of the fluid pressure driving portion and the first transparent elastic membrane, and a second cavity connected to the first cavity of the fluid pressure driving portion be formed in an inner portion of a body of the lens barrel, and liquid is contained in the second cavity.

In the fluid pressure liquid lens according to the above aspect of the invention, it is preferable that two or more fluid pressure generating grooves be formed in the fluid pressure driving portion, and the fluid pressure generating grooves be disposed symmetrically with respect to the first cavity.

In the fluid pressure liquid lens according to the above aspect of the invention, it is preferable that the actuator of the fluid pressure driving portion include: a second transparent elastic membrane which is fixed on an inner wall of the fluid pressure generating groove; a permanent magnet which is disposed in a sealed space between an inner wall of the fluid pressure generating groove and the second transparent elastic membrane; and a solenoid which is disposed in a body of the fluid pressure driving portion adjacent to the inner wall on which the second transparent elastic membrane is fixed, wherein the actuator changes a position of the permanent magnet by using the solenoid and deforms a shape of the second transparent elastic membrane according to the position of the permanent magnet so as to adjust the fluid pressure.

In the fluid pressure liquid lens according to the above aspect of the invention, it is preferable that the solenoid be adhered to a body of the fluid pressure driving portion by using a curable polymer.

In the fluid pressure liquid lens according to the above aspect of the invention, it is preferable that each of the one or more actuators of the fluid pressure driving portion be configured with a piezoelectric device.

In the fluid pressure liquid lens according to the above aspect of the invention, it is preferable that a controller which controls the one or more actuators be further included outside the fluid pressure liquid lens, and the controller independently or simultaneously control the one or more actuators.

According to a fluid pressure liquid lens of the invention where an actuator integrated into an inner portion of the liquid lens is installed, a separate fluid pressure driving unit needs not to be installed, so that it is possible to reduce production costs and to miniaturize the lens.

In addition, according to a fluid pressure liquid lens of the invention where one or more actuators are disposed, the actuators can be independently or simultaneously controlled, so that it is possible to accurately quantitatively adjust the focal length.

In addition, according to a fluid pressure liquid lens of the invention where an actuator configured with an electromagnetic device is used, it is possible to implement the liquid lens having a high response speed.

DETAILED DESCRIPTION OF THE INVENTION

Hereinafter, structures of fluid pressure liquid lenses and operating principles thereof according to embodiments of the invention will be described in detail with reference to attached drawings.

First Embodiment

Figure 1:
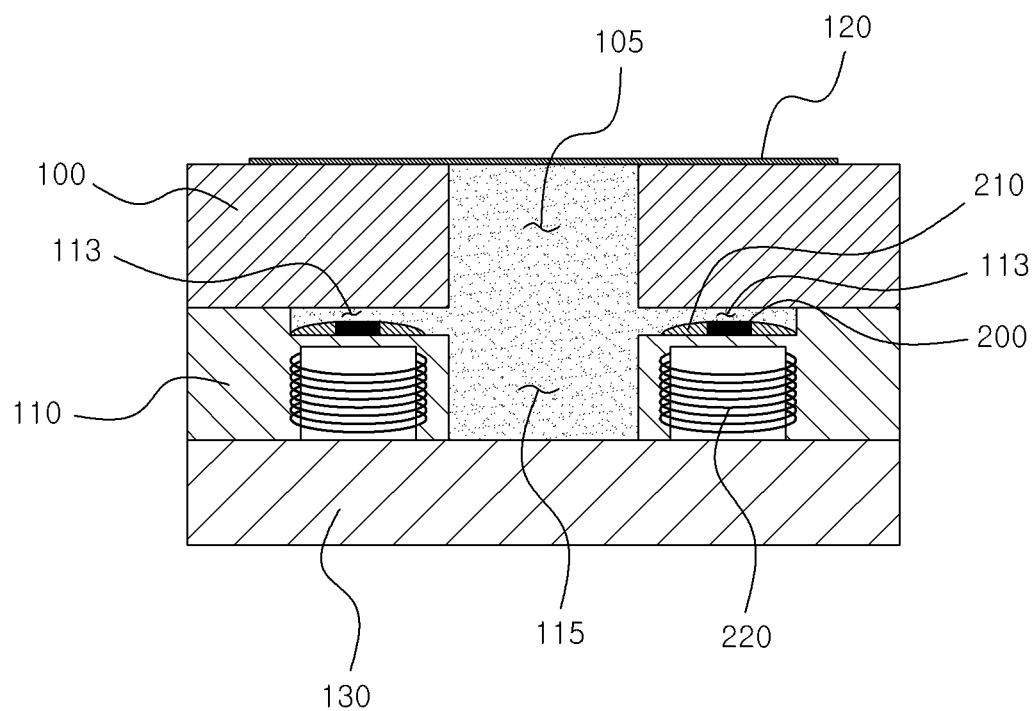
FIG. 1 is a schematic side cross-sectional view illustrating a fluid pressure liquid lens according to a first embodiment of the invention.

FIG. 1 is a schematic side cross-sectional view illustrating a fluid pressure liquid lens according to a first embodiment of the invention. Referring to FIG. 1, the fluid pressure liquid lens according to the first embodiment of the invention includes a fluid pressure driving portion 110, a first transparent elastic membrane 120, and a transparent substrate 130. The fluid pressure liquid lens may further include a lens barrel 100.

A first cavity 115 and a fluid pressure generating groove 113 connected to the first cavity 115 are formed in an inner portion of the fluid pressure driving portion 110. Liquid is contained in the first cavity 115 and the fluid pressure generating groove 113. The fluid pressure driving portion 110 includes one or more actuators which generate a fluid pressure to the fluid pressure generating groove 113. The fluid pressure driving portion 100 adjusts the fluid pressure applied to the liquid contained in the fluid pressure generating groove by using the actuator, so that a focal length of the fluid pressure liquid lens is adjusted. On the other hand, it is preferable that the fluid pressure generating groove 113 is formed so as to be perpendicularly connected to the first cavity 115.

The first transparent elastic membrane 120 is disposed on an upper portion of the fluid pressure driving portion 110 to seal the liquid contained in the fluid pressure driving portion 110. The first transparent elastic membrane 120 is made of a material of which the curvature is changed according to the fluid pressure applied to the liquid. In the case where the liquid is pushed upwards by the fluid pressure generated from the fluid pressure generating groove 113 of the fluid pressure driving portion 110 so as to be in a convex form, the curvature of the first transparent elastic membrane 120 is also changed, so that the focus of the fluid pressure liquid lens is changed.

The transparent substrate 130 is disposed on a lower portion of the fluid pressure driving portion 110 to seal the liquid contained in the fluid pressure driving portion 110. The transparent substrate 130 is made of a transparent material which allows incident light to pass through.

The fluid pressure generating groove 113 of the fluid pressure driving portion 110 may be disposed at any position where the fluid pressure generating groove 113 can be connected to the first cavity. In the first embodiment of the invention, it is exemplified that the fluid pressure generating groove 113 is formed in an upper portion of the fluid pressure driving portion 110. As illustrated in FIG. 1, it is preferable that the fluid pressure generating groove 113 is formed in an upper portion of the fluid pressure driving portion 110. In particular, it is preferable that two or more fluid pressure generating grooves are formed so as to be symmetric with respect to the first cavity 115.

In the case where the fluid pressure generating groove 113 is disposed in the upper portion of the fluid pressure driving portion 110, the lens barrel 100 is disposed between the upper surface of the fluid pressure driving portion 110 and the first transparent elastic membrane 120, so that the first transparent elastic membrane 120 is not directly influenced by the actuator. This is because, in the case where the first transparent elastic membrane 120 is directly deformed by the fluid pressure generated by the actuator, it is difficult to quantitatively control the focus of the fluid pressure liquid lens.

A second cavity 105 connected to the first cavity 115 of the fluid pressure driving portion 110 is formed in an inner portion of the lens barrel 100. Liquid is contained in the second cavity 105. It is preferable that the cross-sectional area of the second cavity 105 is equal to the cross-sectional area of the first cavity 115.

In the fluid pressure liquid lens having the above configuration according to the first embodiment of the invention, the fluid pressure generated by the fluid pressure generating groove is transferred to the liquid in the first cavity of the fluid pressure driving portion, and subsequently, transferred to the liquid in the second cavity of the lens barrel, so that the liquid is pushed upwards from the lens barrel. Therefore, the first transparent elastic membrane is expanded convexly. Accordingly, it is possible to adjust the curvature of the first transparent elastic membrane by adjusting the fluid pressure, and thus, it is possible to change the focal length of the fluid pressure liquid lens according to the first embodiment of the invention.

Hereinafter, the operating principle of the fluid pressure liquid lens according to the first embodiment of the invention will be described in detail. Any device which generates pressure can be adapted to the aforementioned actuator of the fluid pressure liquid lens. It is preferable that the actuator be configured with one of an electromagnetic device, and a piezoelectric device. In this embodiment, it is exemplified that the actuator is configured with an electromagnetic device.

Referring to FIG. 1, an actuator of the actuator of the fluid pressure liquid lens according to the first embodiment of the invention is configured to include a permanent magnet 200, a second transparent elastic membrane 210, and a solenoid 220.

The second transparent elastic membrane 210 is fixed on an inner wall of the fluid pressure generating groove 113, and thus, a sealed space is formed between the inner wall of the fluid pressure generating groove and the second transparent elastic membrane.

Figure 3:
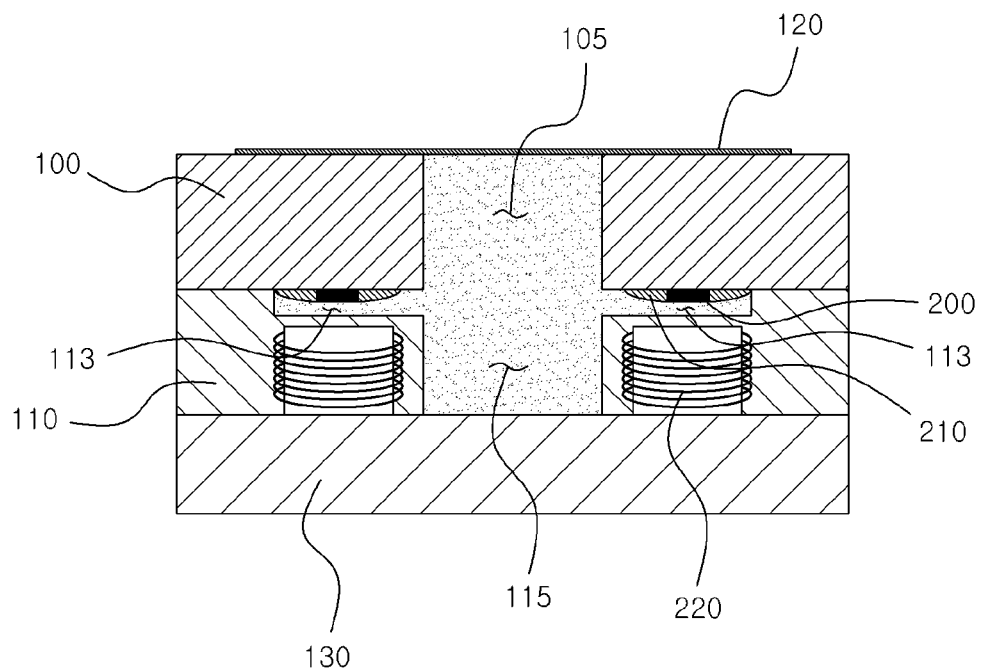
FIG. 3 is a view illustrating a fluid pressure liquid lens according to an example of the first embodiment of the invention.

The permanent magnet 200 is disposed in the sealed space formed between the inner wall of the fluid pressure generating groove and the second transparent elastic membrane. FIG. 1 exemplifies an arrangement where the permanent magnet 200 is disposed on the body of the fluid pressure driving portion which is a lower position of the fluid pressure generating groove. On the other hand, FIG. 3 is a side cross-sectional view illustrating another example of an arrangement position of the permanent magnet of the fluid pressure liquid lens according to the first embodiment of the invention. FIG. 3 exemplifies an arrangement where the permanent magnet 200 is disposed on a lower surface of the lens barrel which is an upper position of the fluid pressure generating groove.

On the other hand, the second transparent elastic membrane 210 is configured to surround the permanent magnet 200 so as to fix the permanent magnet on an inner wall of the fluid pressure generating groove 113. The second transparent elastic membrane 210 has an elastic force so as to allow the position of the permanent magnet to be changed according to an external force. In other words, when the external force is not exerted, the permanent magnet is fixed on the inner wall of the fluid pressure generating groove by the second transparent elastic membrane; and when the external force is exerted, the position of the permanent magnet is changed. However, since the second transparent elastic membrane has an elastic force, if the external force is removed, the permanent magnet 200 returns to its original position. Therefore, the second transparent elastic membrane 210 serves as a spring, so that the permanent magnet 200 can be allowed to move up and down.

The solenoid 220 is disposed in the body of the fluid pressure driving portion adjacent to the inner wall on which the second transparent elastic membrane is fixed. If a current is applied to the solenoid (coil), a magnetic field is induced to the solenoid, so that the solenoid operates as an electromagnet. It is preferable that the solenoid 220 is adhered to the body of the fluid pressure driving portion by using a curable polymer such as PDMS (polydimethylsiloxane).

It is preferable that a controller is further provided outside the fluid pressure liquid lens according to the first embodiment of the invention, and the actuator configured with an electromagnetic device having the aforementioned configuration is controlled by the controller.

The controller applies a current to the solenoid. At this time, according to whether the permanent magnet is disposed at a lower position of the fluid pressure generating groove as illustrated in FIG. 1 or the permanent magnet is disposed at an upper position of the fluid pressure generating groove as illustrated in FIG. 3, the direction of applied current becomes different. In other words, in the case where the permanent magnet 200 is disposed at the lower position of the fluid pressure generating groove as illustrated in FIG. 1, the solenoid determines the direction of the current so that a repulsive force is exerted to the permanent magnet. Therefore, the permanent magnet 200 is pushed upwards, so that the fluid pressure can be generated.

Figure 2:
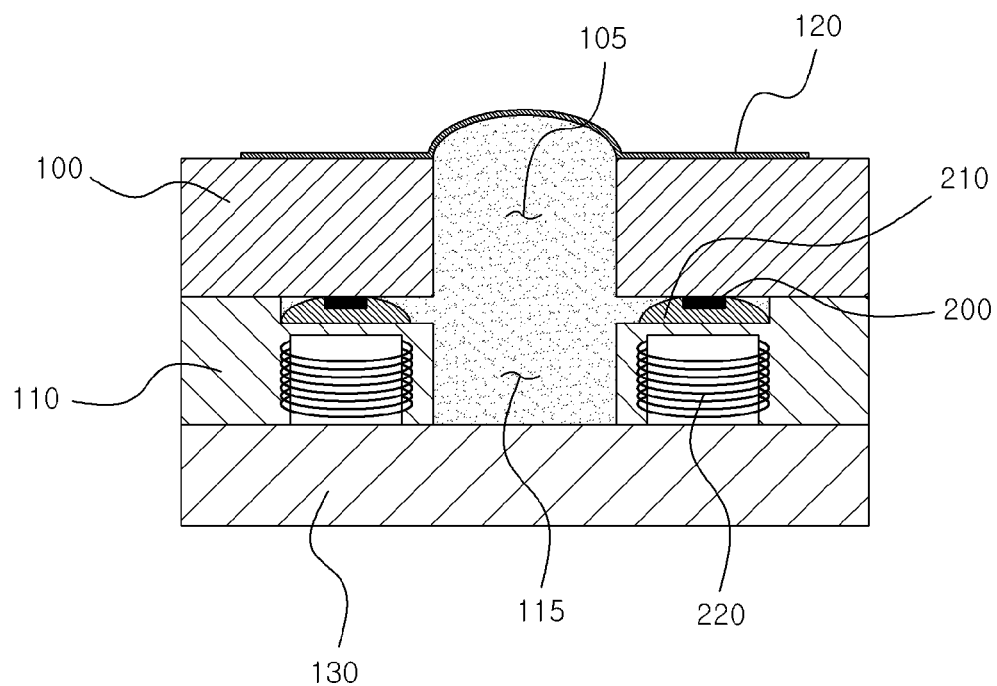
FIG. 2 is a schematic side cross-sectional view illustrating a driving state of the fluid pressure liquid lens according to the first embodiment of the invention.

FIG. 2 is a view illustrating a driving state of the fluid pressure liquid lens according to the first embodiment of the invention. Referring to FIG. 2, as described above, the permanent magnet 200, which is pushed upwards, together with the second transparent elastic membrane 210 pushes the liquid contained in the fluid pressure generating groove outwards, so that the fluid pressure can be generated.

Similarly, in the case where the permanent magnet 200 is disposed at the upper position of the fluid pressure generating groove as illustrated in FIG. 3, the solenoid determines the direction of the current so that an attractive force is exerted to the permanent magnet 200. Therefore, the permanent magnet 200 is drawn downwards, so that the fluid pressure can be generated.

Figure 4:
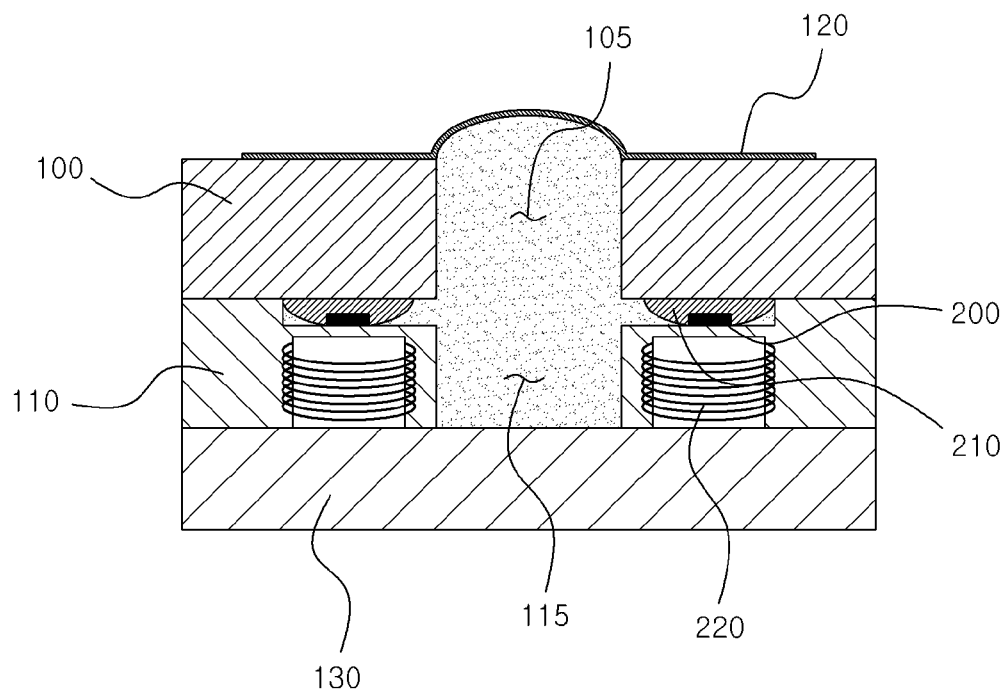
FIG. 4 is a view illustrating a driving state of the fluid pressure liquid lens according to the example of the first embodiment of the invention.

FIG. 4 is a view illustrating a driving state of the fluid pressure liquid lens illustrated in FIG. 3. Referring to FIG. 4, ad described above, the permanent magnet 200, which is drawn downwards, together with the second transparent elastic membrane 210 pushes the liquid contained in the fluid pressure generating groove outwards, so that the fluid pressure can be generated.

On the other hand, the controller independently or simultaneously controls one or more actuators provided to the fluid pressure liquid lens, so that it is possible to accurately quantitatively adjust the fluid pressure.

In this manner, in the fluid pressure liquid lens according to the first embodiment of the invention, the fluid pressure is generated by adjusting the magnetic signal of the permanent magnet disposed in the fluid pressure generating groove and the magnetic signal of the solenoid, and thus, the curvature of the liquid on the upper portion of the fluid pressure liquid lens and the curvature of the first transparent elastic membrane are changed, so that it is possible to change the focal length.

Second Embodiment

Hereinafter, a structure of a fluid pressure liquid lens and an operating principle thereof according to a second embodiment of the invention will be described in detail with reference to attached drawings.

Figure 5:
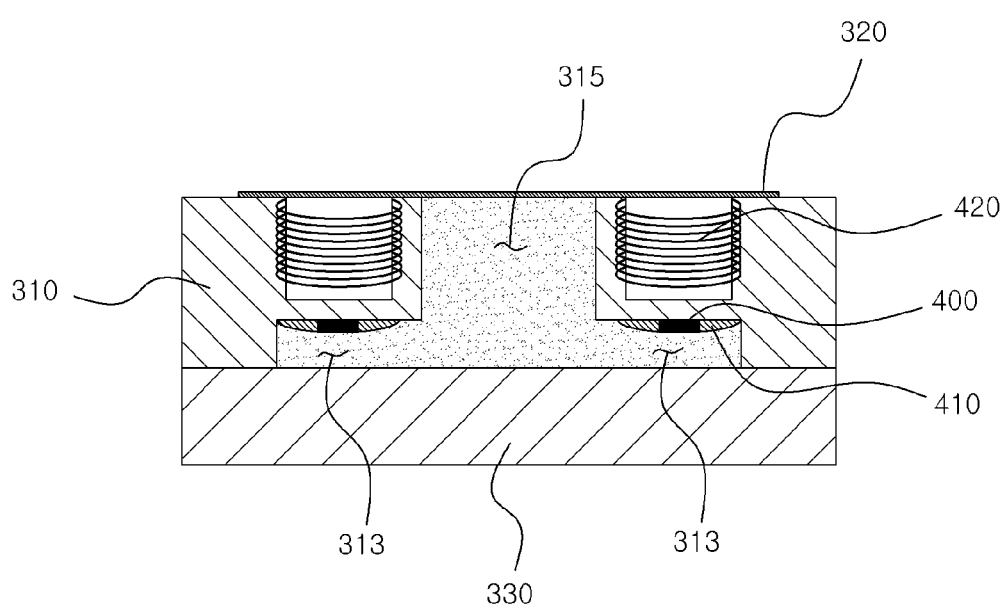
FIG. 5 is a schematic side cross-sectional view illustrating a fluid pressure liquid lens according to a second embodiment of the invention.

FIG. 5 is a schematic side cross-sectional view illustrating the fluid pressure liquid lens according to the second embodiment of the invention. Referring FIG. 2, the fluid pressure liquid lens according to the second embodiment of the invention includes a fluid pressure driving portion 310, a first transparent elastic membrane 320, and a transparent substrate 330. The fluid pressure liquid lens according to the second embodiment is similar to that according to the first embodiment except that a fluid pressure generating groove 313 of the fluid pressure driving portion 310 is formed in a lower portion of the fluid pressure driving portion 310.

In the fluid pressure liquid lens according to the second embodiment, the fluid pressure generating groove 313 is formed in a lower portion of the fluid pressure driving portion 310. The fluid pressure generating groove 313 formed in the lower portion and the transparent substrate disposed on the lower portion constitute an internal space. Therefore, similarly to the first embodiment, a permanent magnet 400 constituting the actuator may be disposed on a body of the fluid pressure driving portion or on the transparent substrate. In FIG. 5, it is exemplified that the permanent magnet 400 is disposed on the body of the fluid pressure driving portion as an upper position of the fluid pressure generating groove.

Figure 6:
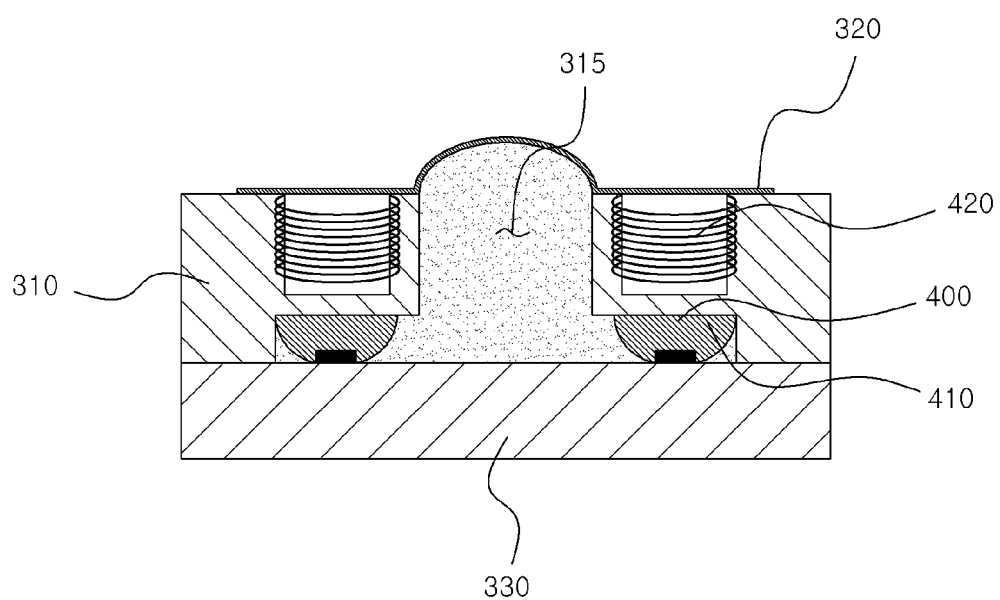
FIG. 6 is a view illustrating a driving state of the fluid pressure liquid lens according to the second embodiment of the invention.

A solenoid 420 constituting the actuator is disposed in the body of the fluid pressure driving portion. If an electrical signal is applied to the solenoid, the solenoid 420 generates a magnetic signal. At this time, it is preferable that a magnetic polarity of the magnetic signal is the same as that of the permanent magnet 400 in order to push the permanent magnet 400 downwards. FIG. 6 is a view illustrating a driving state of the fluid pressure liquid lens according to the second embodiment of the invention. Referring to FIG. 6, if the controller allows the solenoid 420 to generate the magnetic signal which is the same as that of the permanent magnet, the permanent magnet 400 is pushed downward, so that the second transparent elastic membrane 410 surrounding the permanent magnet 400 is also deformed. Due to the permanent magnet and the second transparent elastic membrane, the liquid in the fluid pressure generating groove 313 is pushed outwards, so that the fluid pressure is generated. Due to the fluid pressure, the liquid is deformed to be expanded convexly from an upper portion of a first cavity 315, so that the curvature of the first transparent elastic membrane is changed. Therefore, according to the change in the curvature of the liquid and the curvature of the first transparent elastic membrane, it is possible to adjust the focal length of the fluid pressure liquid lens according to the second embodiment.

On the other hand, if necessary, the fluid pressure liquid lens according to the second embodiment may further include a lens barrel including a second cavity connected to the first cavity 315 of the fluid pressure driving portion in an inner portion thereof. Liquid is contained in the second cavity of the lens barrel. In this case, the lens barrel is disposed between the transparent substrate and the fluid pressure driving portion or between the fluid pressure driving portion and the first transparent elastic membrane.

In the fluid pressure liquid lenses having the aforementioned configurations according to the first and second embodiments of the invention, the actuator is included so as be integrated into an inner portion of the liquid lens, and thus, a separate fluid pressure driving unit is not necessarily provided. Therefore, it is possible to reduce production costs and to miniaturize the lens. In addition, one or more actuators are disposed, and the actuators can be independently or simultaneously controlled by the controller, so that it is possible to accurately quantitatively adjust the focal length. In addition, in fluid pressure liquid lenses having the aforementioned configurations according to the first and second embodiments of the invention, an actuator configured with an electromagnetic device is used, so that it is possible to embody a liquid lens having a high response speed.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The fluid pressure liquid lens according to the invention can be adapted to all the fields where a variable focus lens is needed. Particularly, the fluid pressure liquid lens can be widely used in the field of mobile terminals which have been more miniaturized and various functions are integrated into.

What is claimed is:

1. A fluid pressure liquid lens of which focus can be adjusted, comprising:
   a fluid pressure driving portion which is configured to include a first cavity, a fluid pressure generating groove connected to the first cavity, and an actuator generating a fluid pressure on liquid contained in the first cavity and the fluid pressure generating groove so as to adjust the fluid pressure by using the actuator;
   a first transparent elastic membrane which is disposed on an upper surface of the fluid pressure driving portion to seal an upper portion of the first cavity of the fluid pressure driving portion and of which the curvature is changed according to the fluid pressure of the liquid; and
   a transparent substrate which is disposed on a lower surface of the fluid pressure driving portion to seal a lower portion of the first cavity of the fluid pressure driving portion and which is made of a optically transparent material,
   wherein a focal length is adjusted by using the fluid pressure generated by the actuator.

2. The fluid pressure liquid lens according to claim 1, wherein the fluid pressure generating groove is perpendicularly connected to the first cavity.

3. The fluid pressure liquid lens according to claim 1, further comprising a lens barrel on an upper or lower surface of the fluid pressure driving portion,
   wherein a second cavity connected to the first cavity of the fluid pressure driving portion is formed in an inner portion of a body of the lens barrel, and liquid is contained in the second cavity.

4. The fluid pressure liquid lens according to claim 1, further comprising a lens barrel between an upper surface of the fluid pressure driving portion and the first transparent elastic membrane,
   wherein a second cavity connected to the first cavity of the fluid pressure driving portion is formed in an inner portion of a body of the lens barrel, and liquid is contained in the second cavity.

5. The fluid pressure liquid lens according to claim 1, wherein two or more fluid pressure generating grooves are formed in the fluid pressure driving portion, and
   wherein the fluid pressure generating grooves are disposed symmetrically with respect to the first cavity.

6. The fluid pressure liquid lens according to claim 1, wherein the actuator of the fluid pressure driving portion includes:
   a second transparent elastic membrane which is fixed on an inner wall of the fluid pressure generating groove;
   a permanent magnet which is disposed in a sealed space between an inner wall of the fluid pressure generating groove and the second transparent elastic membrane; and
   a solenoid which is disposed in a body of the fluid pressure driving portion adjacent to the inner wall on which the second transparent elastic membrane is fixed,
   wherein the actuator changes a position of the permanent magnet by using the solenoid and deforms a shape of the second transparent elastic membrane according to the position of the permanent magnet so as to adjust the fluid pressure.

7. The fluid pressure liquid lens according to claim 6, wherein the solenoid is adhered to a body of the fluid pressure driving portion by using a curable polymer.

8. The fluid pressure liquid lens according to claim 1, wherein the actuator of the fluid pressure driving portion is configured with a piezoelectric device.

9. The fluid pressure liquid lens according to claim 1, further comprising a controller which controls operations of the actuator outside the fluid pressure liquid lens.

* * * * *